United States Patent [19]

Ritter

[11] Patent Number: 5,374,311
[45] Date of Patent: Dec. 20, 1994

[54] COMPOSITION FOR RENDERING WASTE SUBSTANCES HARMLESS

[76] Inventor: Robert A. Ritter, 1705 Nelson Street, No. 108, Vancouver, British Columbia, Canada, V6G 1M6

[21] Appl. No.: 167,056

[22] Filed: Dec. 16, 1993

Related U.S. Application Data

[62] Division of Ser. No. 804,310, Dec. 9, 1991, Pat. No. 5,290,351.

[51] Int. Cl.$^5$ .................... C04B 24/08; C04B 2/00
[52] U.S. Cl. ................... 106/795; 106/244; 106/250; 106/266
[58] Field of Search ............... 106/244, 250, 266, 795

[56] References Cited

U.S. PATENT DOCUMENTS

| 842,212 | 1/1907 | Kyle | 106/244 |
| 4,018,679 | 4/1977 | Bolsing | 210/36 |
| 4,383,783 | 5/1983 | Kruka et al. | 106/266 |

FOREIGN PATENT DOCUMENTS 0047233  6/1981  European Pat. Off. .

Primary Examiner—David Brunsman
Attorney, Agent, or Firm—Nixon & Vanderhye

[57] ABSTRACT

A novel hydrophobizing agent is provided for use in a composition for rendering waste substances harmless. The agent comprises a liquid blend of a specified mixture of liquid fatty acids having from 6 to 12 carbon atoms and a specified mixture of glycerides of fatty acids having from 8 to 18 carbon atoms.

9 Claims, No Drawings

COMPOSITION FOR RENDERING WASTE SUBSTANCES HARMLESS

This is a divisional of application Ser. No. 07,804,310, filed Dec. 9, 1991, now U.S. Pat. No. 5,290,351.

BACKGROUND OF THE INVENTION (i) Field of the Invention

This invention relates to a composition for rendering waste substances harmless and to a method for making such composition.

(ii) Description of the Prior Art

The art has been faced with the problem of rendering waste substances harmless, particularly at the present time with the emphasis on enhancing the environment.

Common by-products of plants in which chemicals are made or treated on an industrial scale are aqueous sludges often containing a high proportion of relatively inert fine particulate materials a variety of reactive materials in sufficiently small concentrations as to make the reclamation thereof uneconomical.

Often the available reactive compounds in the sludge solids include concentrations in the 0.5–5.0 weight percent range of common materials, e.g. sulfate ions, calcium ions, aluminum ions, and iron ions or sources thereof. The water content of such sludges may vary considerably, and is typically in the range of 10–90 per cent by weight.

Yet another disposal problem relates to soil contaminated through intentional or accidental spills of petroleum oils, hydrocarbon solvents or other, semi-volatile or non-volatile organic materials. Such contaminants may extend over large tracts of land and may directly or indirectly, such as through subsequent contamination of an underlying aquifer, constitute an extreme threat of wildlife, vegetation or human health. Conventional methods, such as land farming or those described above in connection with oil well sumps are similarly unsuitable.

The disposition of such sludges has always been a problem. With the increasing awareness of the undesirability of discharging such waste materials into the environment and the resulting governmental regulation of such discharges, the need for a convenient, harmless, and economical way of disposing of such sludges or converting them into a useful product is becoming increasingly apparent. A further incentive is provided by the capital investment and land required for the disposition of such sludges by conventional means, which often include large settling ponds or storage piles.

Another disposal problem relates to oil well sumps. Oil well sumps are artificial pits used as dump sites for all kinds of liquid and viscous wastes. The physical consistency of the sump varies according to the random materials dumped. Typically, however, in the absence of a water layer, the consistency is pasty. Inasmuch as sumps create traps for wild fowl, there is an increasing demand for elimination of sumps, especially those not being commercially used. In addition, they are unsightly. The traditional treatment has been to dump and mix dirt into the sump and thereby soak up sufficient of the oil until the dirt-sump material can be moved by conventional equipment. The mixture is then spread to dry. This treatment has not been acceptable because the mixture bleeds oil and chemicals. Over the months arid years this dirt-sump mixture oozes oil and becomes almost as objectionable as the original oil sump. This unsatisfactory type of treatment has called for an improved solution to the ecological problem of sump elimination.

The increasing use of hydrophobic substances, e.g. oils and oily substances, as well as macromolecular substances especially, has created new problems which arise mainly out of the handling of these substances. Particularly, the use of old oil, heating oils, lubricating oils and diesel fuels often leads, either intentionally or through negligence, and often due to emergency situations, to dangerous contamination of the environment.

There are a number of methods for rendering such oils or oily substances which, in a single phase or in multiple phase systems, entail an endangerment of the environment harmless. For example, oil can be chemically reacted by being burned, for example, or biologically degraded. The combustion method used frequently in combatting oil damage results in considerable air pollution if the burning is performed in the open rather than in expensive combustion apparatus.

The use of adsorbents solves such problem only when the oil can be fixed with them in such a manner that it is chemically unaltered but is encapsulated or otherwise isolated or is accessible to biological degradation and no longer constitutes any danger to the environment. With the known adsorptive agents, e.g. active charcoal, kieselguhr or bentonire, waste oil, for example, can be adsorptively bound only with difficulty. Large amounts of oil may cement the adsorptive agent, especially in the case of high-viscosity oils, making further processing difficult.

It has furthermore been proposed in various ways to treat porous mineral substances with hydrophobic substances for the purpose of improving their adsorptive characteristics. In this manner hydrophobic waste substances can be preferentially bound, while the waiter is no longer primarily absorbed. In such adsorptive agents, such as hydrophobized pearlite, however, the absorptive capacity is greatly reduced, since the mineral starting material is partially sealed by surface treatment with hydrophobizing substances, so that the inner cavities are no longer accessible.

It is particularly important that the substances which are adsorptively bound by the known processes are so fixed on the adsorptive agent that they no longer constitute any danger to the environment.

In addition to the general, mainly unsatisfactory procedures for the problems of disposal of such wastes discussed above, the patent literature has purported to provide solutions to these problems. For example, one solution to the problem was said to be provided in U.S. Pat. No. 3,720,609, patented Mar. 13, 1973 by C. L. Smith et al. That patent provided a procedure whereby waste sludges containing small amounts of certain types of reactive materials were treated by adding, to such sludges, materials capable of producing aluminum ions, lime and/or sulfate bearing compounds to produce a composition having a sufficient concentration of sulfate ions, aluminum ions and equivalents thereof, and calcium ions and equivalents thereof. Over a period of time such compositions hardened by the formation of calcium sulfo-aluminate hydrates.

Another solution to the problem was said to be provided in U.S. Pat. No. 4,028,240 patented Jun. 7, 1977 by F. Marchak Jr. That patent provided a procedure whereby lime, preferably as calcium oxide, was mixed with the contents of sumps, such as oil well sumps, and these generally have a pasty or plastic consistency. The calcium oxide reacted with the materials present and also dehydrated the contents of the sump, causing the sump contents to stiffen.

Yet another solution to this problem was said to be achieved in U.S. Pat. No. 4,018,679 patented Apr. 19, 1977 by F. Bolsing. That patent provided a method for rendering an oil waste material harmless by mixing an alkaline earth metal oxide with a surface active agent which delayed reaction between the alkaline earth metal oxide and water, combining the mixture with oily material, e.g. a sludge or an oil contaminated soil, and reacting the alkaline earth metal oxide charged with the waste material with approximately the stoichiometric amount of water to convert the alkaline earth metal oxide to the hydroxide. The alkaline earth metal oxide was preferably calcium oxide and advantageously it was also mixed with a hydrophobizing agent prior to mixture with the oily waste material.

In the patent to Bolsing described above, the composition used was preferably prepared by blending lime with a solid fatty acid (in particular, a commercial grade of stearic acid commonly called stearin) by slowly adding the acid to coarse lime as it was subjected to the process of fine-grinding. The purpose of this operation was to render the lime hydrophobic, thereby delaying its hydration reaction with water and permitting it to be intimately mixed with contaminated soil by mechanical means. Subsequent hydration then resulted in an extremely fine and uniform dispersion of the contaminants, hydrated lime and soil. In practice, however, the purpose of that invention was not always achieved to its optimum.

3) SUMMARY OF THE INVENTION (i) Aims of the Invention

Accordingly, a principal object of the present invention is to provide a novel hydrophobizing agent which effectively inhibits lime hydration until the lime-water mixture is mechanically bended through vigorous stirring, then allowed to remain essentially undisturbed at which time reaction occurs at a high rate.

(ii) Statements of Invention

The present invention, in one of its broadest features provides a hydrophobizing agent which comprises: a liquid blend of (a) a mixture of liquid saturated fatty acids having from 6 to 12 carbon atoms; with (b) a mixture of glycerides of fatty acids having from 8 to 18 carbon atoms.

The present invention also provides a solid mixture which comprises: A) (a) a liquid mixture of liquid saturated fatty acids having from 6 to 12 carbon atoms with (b) a mixture of glycerides of fatty acids having from 8 to 18 carbon atoms; and B) finely ground lime.

The present invention also provides a method for preparing the above-described solid mixture which comprises: steps of feeding the above-described hydrophobizing agent of a) and b) to a spray nozzle; and spraying such hydrophobizing agent into a rising air stream carrying the fine lime particles.

(iii) Other Features of the Invention

The mixture of liquid saturated fatty acids consists mainly of about 55% caprylic acid and about 42% capric acid by weight, and most preferably consists of: about 1% caproic acid; about 55% caprylic acid; about 42% capric acid and about 2% lauric acid.

The preferred mixture of glycerides is coconut oil; other mixtures of glycerides include babassu oil and palm kernel oil.

In particular the ratio of (a), (b) is about 90:10 to about 65:35, with the optimum ratio being about 73:27.

The amount of the hydrophobizing composition is selected to be sufficient fully to coat the finely divided lime particles. In practice therefore, this would range from about 0.5% to about 2.5% by weight, with the optimum amount being about 1.0%. The size of the finely divided lime is generally within the range of $-10$ mesh to sub-micron sizes, preferably $-100$ to sub-micron sizes.

The pressure gradient across the spray nozzles should be 10 to 30 psig. The velocity of upward flow of air is within the range 50 to 100 ft/sec.

4) GENERALIZED DESCRIPTION OF THE INVENTION

By the present invention, a novel hydrophobizing agent has been provided which comprises a liquid blend of certain liquid saturated fatty acids and certain glycerides of fatty acids. The resulting blend is a liquid at room temperature, thereby allowing it to be very easily and uniformly combined with the fine-ground lime. This procedure is accomplished with the aid of a spray nozzle which introduces the hydrophobizing agent into a rising air stream carrying the fine lime particles.

The chief constituents of coconut oil are the glyceride of lauric acid, with appreciable amounts of the glycerides of captic, myristic, palmitic and oleic acids. The general composition of fatty acids in coconut oil is as follows: caprylic, about 8.0; captic, about 7.0; lauric, about 48.0; myristic, about 17.5; palmitic, about 8.2; stearic, about 2.0; oleic, about 6.0 and linoleic, about 2.5.

In one preferred coconut oil, the approximate composition of the fatty acids is as follows: lauric acid, about 47%; myristic acid, about 19%; palmitic acid, about 9%; oleic acid, about 7%; stearic acid, about $<3\%$ and other (lower molecular weight fatty acids), about $>15\%$.

The approximate composition of fatty acids in babassu oil is as follows: caprylic, about 6.5; capric, about 2.7; lauric, about 45.8; myristic, about 19.9; palmitic, about 6.9; and oleic, about 18.1.

The approximate composition of fatty acids in palm kernel oil is as follows: caprylic, 3.0; captic, about 3.0; lauric, about 52.0; myristic, about 15.0; palmitic, about 7.5; stearic, about 2.5; oleic, about 16.0; and linoleic, about 1.0.

A preferred liquid fatty acid mixture is that known by the trademark INDUSTRENE 365 TM of Hunko Products Division; National Dairy Products Corporation. A preferred coconut oil is that known by the trademark VICTORY 76 TM of Bareco Division; Petrolite Corp.

5) DESCRIPTION OF PREFERRED EMBODIMENTS

EXAMPLES

Various blends of INDUSTRENE 365 and coconut oil, ranging from 88.9% to 66.7% INDUSTRENE 365 TM, and the balance VICTORY 76 TM were evaluated in terms of their hydrophobizing/hydration-delaying capability. On the basis of this investigation, it was determined that the most efficacious composition of the final agent blend should be:

1. 73% INDUSTRENE 365 TM. and 2. 27% VICTORY 76 TM. The desired characteristic of the hydrophobizing agent is that it virtually inhibit the lime hydration until the lime-water mixture is mechanically blended with a contaminated soil or other granular material with the aid of vigorous stirring then allowed to remain undisturbed, at which time the reaction should occur at a high rate as indicated by a rapid and extensive rise in temperature. This behaviour is seen to be optimum when the concentration of the hydrophobizing agent in the treated lime is within the range of 0.5% and 2.5%, with the optimum performance noted at approximately 1.0%. It is possible that other blends of oil and fatty acids would perform equally well. For example, blends of liquid fatty acids with babassu oil or with palm kernel oil may be useful.

Moreover, a number of solid and liquid fatty acid agents have been tested and were found to be considerably less satisfactory. Included amongst the liquids examined were the following, identified by their trademarks:

1. Shell ROTELLA 10W ™;
2. Shell VITRE A ™;
3. Esso HDX 10W;
4. Mineral Oil; and
5. INDUSTRENE 106 ™;

The solid additives examined were the following:
Calcium Stearate;
Rubber Grade Stearic Acid;
Single Pressed Stearic Acid;
Neutral 60 (60% to 100% Stearic Acid);
5. Tallow;
6. Cottonseed Oil;
7. Soybean Oil;
8. INDUSTRENE B ™; and
9. INDUSTRENE 143 ™;

In virtually all cases the blended product was not a clear, stable readily-atomizable liquid at room temperatures. One combination, INDUSTRENE 106 ™ plus coconut oil, though a quite atomizable liquid, did not provide as effective a lime-treating agent as did the blend of the present invention.

The hydrophobizing agent of the present invention also acts as an activator/initiator in a method for rendering waste substances harmless.

In such novel method, at some point during the lime hydration reaction, the present hydrophobizing agent begins to react with, or in the presence of, the lime. Coupled with its destruction is the release of sufficient heat to raise the temperature of the mass significantly above 100° C., the boiling point of water. At this temperature, hydration, which clearly involves water as a reactant, must soon cease. This behaviour of the agent as an activator/initiator contributes to the chemical destruction of the oils and other organics originally present in the waste and is a vital mechanism in the operation of the above-described novel method.

6) Conclusion

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A composition for rendering a waste substance harmless comprising:
   A) a hydrophobizing agent comprising a blend which is liquid at room temperature and is readily atomizable, said blend comprising:
      a) a mixture of liquid fatty acids having from 6 to 12 carbon atoms: and
      b) coconut oil; coated on
   B) finely ground lime.

2. The composition of claim 1 wherein the amount of A) is from about 0.5% to about 2.5% by weight of the composition.

3. The composition of claim 2 wherein the amount of A) is about 1.0%.

4. The composition of claim 2 wherein the size of the finely divided lime is from about −10 mesh to submicron size.

5. A composition for rendering a waste substance harmless comprising:
   A) a hydrophobizing agent comprising a blend which is liquid at room temperature and is readily atomizable, said blend comprising:
      a) a mixture of liquid fatty acids having from 6 to 12 carbon atoms: and
      b) a mixture of glycerides of fatty acids having from 8 to 18 carbon atoms coated on
   B) finely ground lime.

6. The composition of claim 5 wherein the amount of A) is sufficient fully to coat the finely ground lime.

7. A method of providing a composition for rendering a waste substance harmless comprising feeding the hydrophobizing agent of claim 5 to a spray nozzle; and spraying such hydrophobizing agent into a rising air stream carrying fine lime particles.

8. The method of claim 7 wherein the pressure gradient across said spray nozzle is from about 10 psig to about 30 psig.

9. The method of claim 7 wherein the air flow velocity is within the range of about 50 ft/sec to about 100 ft/sec.

* * * * *